(12) United States Patent
Tan

(10) Patent No.: US 9,888,347 B1
(45) Date of Patent: Feb. 6, 2018

(54) RESOLVING LOCATION CRITERIA USING USER LOCATION DATA

(71) Applicant: Google Inc., Mountain View, CA (US)

(72) Inventor: Mervyn Tan, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 678 days.

(21) Appl. No.: 14/255,590

(22) Filed: Apr. 17, 2014

(51) Int. Cl.
H04W 4/02 (2009.01)

(52) U.S. Cl.
CPC ............ *H04W 4/023* (2013.01); *H04W 4/021* (2013.01)

(58) Field of Classification Search
USPC .......................... 455/404.1–404.2, 456.1–457
See application file for complete search history.

(56) References Cited

U.S. PATENT DOCUMENTS

| 6,795,699 | B1 | 9/2004 | McCraw et al. | |
|---|---|---|---|---|
| 9,179,256 | B1* | 11/2015 | Pietraniec | H04W 4/021 |
| 2010/0020776 | A1* | 1/2010 | Youssef | H04W 64/00 370/338 |
| 2010/0127919 | A1* | 5/2010 | Curran | H04W 4/021 340/573.4 |
| 2011/0035284 | A1* | 2/2011 | Moshfeghi | G06Q 30/02 705/14.58 |
| 2011/0191823 | A1* | 8/2011 | Huibers | H04W 4/00 726/3 |
| 2011/0309983 | A1 | 12/2011 | Holzer et al. | |
| 2013/0203443 | A1* | 8/2013 | Heater | H04W 4/021 455/456.3 |
| 2014/0031058 | A1* | 1/2014 | Zhang | H04W 16/02 455/456.1 |
| 2014/0278228 | A1 | 9/2014 | Agrawal et al. | |
| 2015/0111523 | A1* | 4/2015 | South | H04W 4/22 455/404.2 |

FOREIGN PATENT DOCUMENTS

| EP | 0874248 | 10/1998 |
|---|---|---|
| WO | 2009/032554 | 3/2009 |

* cited by examiner

*Primary Examiner* — Marcus Hammonds
(74) *Attorney, Agent, or Firm* — Fish & Richardson P.C.

(57) ABSTRACT

Methods, systems, and apparatus, including computer programs encoded on a computer storage medium, for resolving location criteria using user location data. One of the methods includes receiving data identifying an action to be performed in response to received user requests and data identifying location criteria for performing the action; determining a cover sets for possible confidence radii; receiving a plurality of requests, each request being associated with a respective location and a confidence radius for the location; determining, for each of the plurality of requests, whether the location associated with the request is in the cover set corresponding to the confidence radius for the location associated with the request; and for each request for which the location associated with the request is in the cover set for the confidence radius corresponding to the location associated with the request, determining that the location criteria for performing the action are satisfied.

21 Claims, 5 Drawing Sheets

RESOLVING LOCATION CRITERIA USING USER LOCATION DATA

BACKGROUND

This specification relates to resolving geographic location criteria for performing actions in response to user requests.

Systems exist that perform certain actions in response to a user request only if the location of the user submitting the request satisfies one or more location criteria for performing the actions. However, the locations of users as determined by the systems may be associated with varying degrees of uncertainty. For example, some systems determine a user location as a location, e.g., a latitude and longitude pair, and an associated confidence radius. The confidence radius defines a region of confidence centered at the location. The region of confidence includes all of the possible locations for the user as determined by the system and is a representation of the uncertainty of the system in determining a precise location for the user.

Because of the uncertainty associated with user locations, some systems maintain data that represents the location criteria for a request as a target region for the request and a confidence threshold for the target region. The target region is a geographic region in which a user should be located in order for the location criteria for the alert to be satisfied. The confidence threshold defines how confident the system must be that the user is located in the target region for the location criteria to be satisfied. When a user request that includes location data that identifies a user location and a confidence radius for the location is received, in order to determine whether the location criteria for an action are satisfied, such systems determine an area of intersection between the region of confidence for the user location and the target region for the action. If the ratio of the area of intersection to the area of the region of confidence exceeds the confidence threshold, the systems determine that the location criteria are satisfied. If the ratio does not exceed the confidence threshold, the systems determine that the location criteria are not satisfied. Thus, these existing systems account for uncertainty in user locations, but must determine the area of intersection for every request that is received.

SUMMARY

In general, one innovative aspect of the subject matter described in this specification can be embodied in methods that include the actions of receiving data identifying an action to be performed in response to received user requests and data identifying location criteria for performing the action, the data identifying the location criteria including a target region for the request and a confidence threshold for the target region; determining a respective cover set for each of a plurality of possible confidence radii, wherein the respective cover set for each of the plurality of possible confidence radii contains each location that satisfies the confidence threshold when associated with the possible confidence radius; receiving a plurality of requests, each request being associated with a respective location and a confidence radius for the location; determining, for each of the plurality of requests, whether the location associated with the request is in the cover set corresponding to the confidence radius for the location associated with the request; for each request for which the location associated with the request is in the cover set for the confidence radius corresponding to the location associated with the request, determining that the location criteria for performing the action are satisfied; and for each request for which the location associated with the request is not in the cover set for the confidence radius corresponding to the location associated with the request, determining that the location criteria for performing the action are not satisfied.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. Determining a respective cover set for each of the plurality of possible confidence radii can include: partitioning the possible confidence radii into a plurality of intervals; selecting a respective representative radius from each of the plurality of intervals; determining a respective cover set for each representative radius; and for each interval, associating the cover set for the representative radius selected from the interval with the interval.

Determining whether the location associated with the request is in the cover set corresponding to the confidence radius for the location associated with the request can include: determining an interval that contains the location associated with the request; and determining whether the location associated with the request is in the cover set associated with the interval that contains the location associated with the request.

Determining a respective cover set for each representative radius can include determining, for the representative radius, a probability density function for a candidate region, wherein the probability density function takes as an input an input location from the candidate region and outputs a probability that the input location is in the target region when associated with the representative radius; identifying qualifying locations, wherein an output of the probability density function exceeds the confidence threshold for each qualifying location; and generating a cover set for the representative radius that contains each qualifying location.

Determining the probability density function can include: obtaining data partitioning the target region into a plurality of disjoint target region partitions; for each location in the candidate region and for each target region partition, determining a respective probability that the location in the candidate region is in the target region partition when associated with the representative radius; determining the probability density function by, for each location, aggregating the respective probabilities for each target region partition.

Determining the respective probability that the location in the candidate region is in the target region partition when associated with the representative radius can include: determining a ratio between (1) an area of an intersection between a region of confidence centered at the location and having a radius equal to the representative radius and the target region partition and (2) an area of the region of confidence.

The action to be performed in response to received user requests can include providing geographically-relevant information for presentation to users submitting the user requests.

Particular embodiments of the subject matter described in this specification can be implemented so as to realize one or more of the following advantages. Determining whether a user location associated with a user request satisfies location criteria for performing an action can take into account uncertainty associated with determining the user location. Whether or not the user location associated with the user request satisfies the location criteria can be easily and efficiently determined when the request is received. By expressing location criteria as Boolean expressions that are closed under set operations, e.g., union, intersection, and complement operations, the location criteria can be a priori optimized, resulting in improved location criteria resolution when requests are received.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
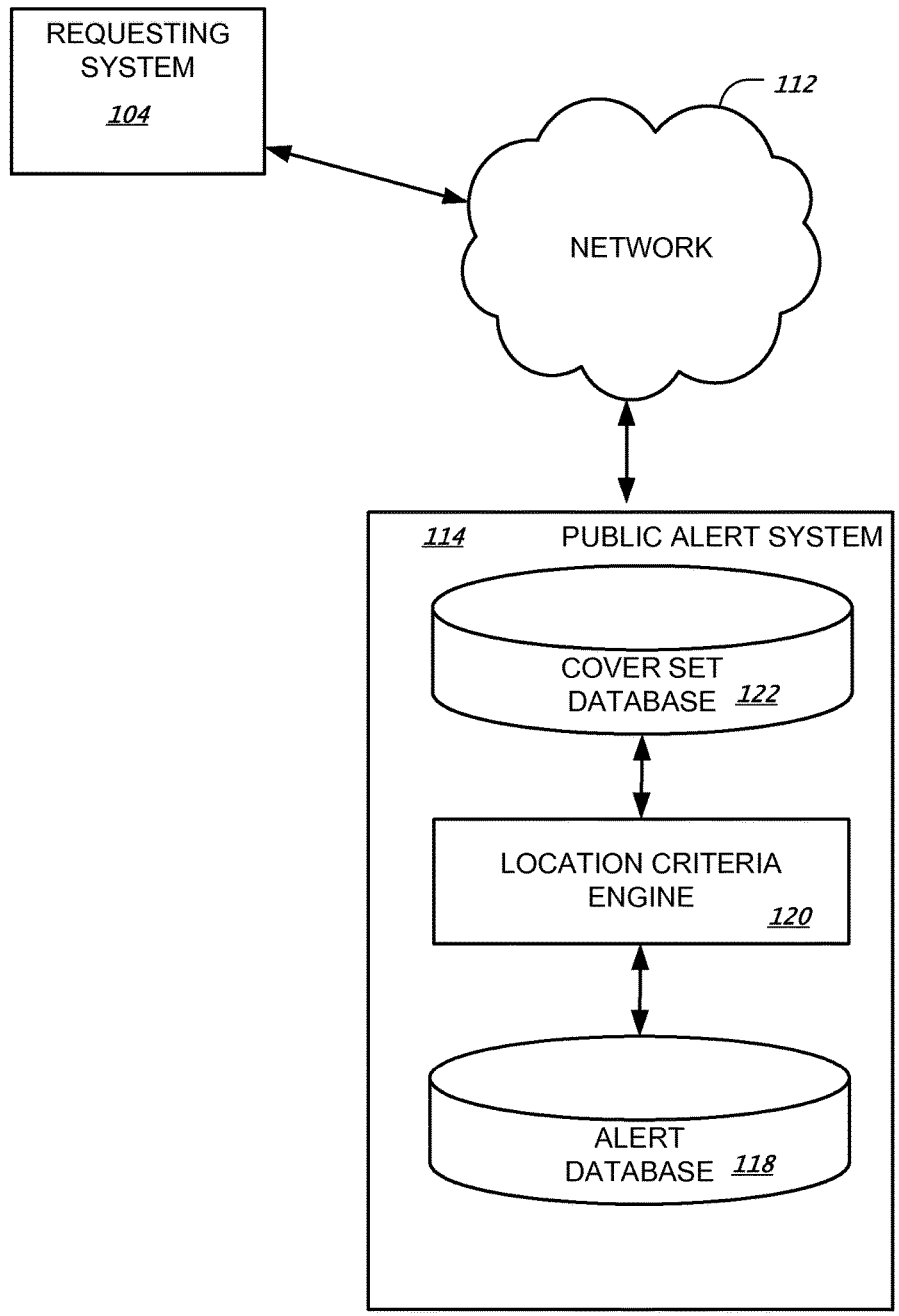
FIG. 1 shows an example public alert system.

FIG. 1 shows an example public alert system 114. The public alert system 114 is an example of a system implemented as computer programs on one or more computers in one or more locations, in which the systems, components, and techniques described below are implemented.

A requesting system 104 can send alert requests to the public alert system 114 through a data communication network 112, e.g., a local area network (LAN), wireless network, or wide area network (WAN), e.g., the Internet, or a combination of networks. The alert requests are requests for data identifying or representing public alerts, e.g., weather alerts, earthquake alerts, national security alerts, traffic alerts, or other kinds of alerts that are of interest to the general public. For example, the requesting system 104 may be a search engine system, and the request may be a request for alerts to be provided or identified in a response to a search query submitted by a particular user, e.g., along with search results for the search query. As another example, the requesting system 104 may be a user device, and the request may be a request for alerts relevant to a current location of the user device.

The public alert system responds to the alert requests by selecting one or more public alerts from an alert database 118 that stores data identifying current public alerts and providing data identifying the selected alerts to the requesting system 104. In this specification, the term "database" will be used broadly to refer to any collection of data: the data does not need to be structured in any particular way, or structured at all, and it can be stored on storage devices in one or more locations. Thus, for example, the alert database 118 can include multiple collections of data, each of which may be organized and accessed differently.

Generally, the public alerts identified in the alert database 118 will only be relevant to users located in particular locations. For example, a tornado alert for Indianapolis, Ind., would not be relevant to a user in London, England. Similarly, an alert about a road closure in San Francisco, Calif., would not be relevant to a user in Monterey, Calif., a city that is a three hour drive from San Francisco. Thus, each alert stored in the alert database 118 is associated with location criteria. If a received request does not satisfy the location criteria for the alert, the public alert system 114 does not provide the alert in response to the request.

The location criteria for each alert identify a target region for the alert and a confidence threshold for the target region. The target region for the alert is a geographic region in which a user should be located in order for the location criteria to be satisfied. The confidence threshold defines how confident the public alert system 114 must be that the user is located in the target region for the location criteria to be satisfied. For example, the location criteria for a tsunami alert for San Francisco County may be associated with location criteria that identify San Francisco County as the target region and that specify that there must be a 0.5 probability that the user is located in San Francisco County for the location criteria to be satisfied. The alert system may optionally specify different default confidence thresholds for different kinds of alerts as well as specific confidence thresholds for specific alerts.

In order for the public alert system 114 to determine whether location criteria for alerts are satisfied, public alert requests received by the public alert system 114 are associated with location data that identifies a location for a user to whom the public alert would be presented. The location of the user is a geographic location that is expressed as (x, y) coordinates, e.g., a latitude and longitude pair. However, because there is some uncertainty about the accuracy of the user location, the location data also identifies a confidence radius for the location. The confidence radius defines a region of confidence centered at the user location that includes all possible locations for the user as determined by the requesting system 104. For example, the region of confidence may be a circle centered at the user location having a radius equal to the confidence radius or a square having a pre-determined orientation, being centered at the user location, and having a radius, i.e., a distance from the center to any of the vertices, equal to the confidence radius. Thus, the larger the confidence radius, the more uncertainty the requesting system 104 has about the actual location of the user.

The public alert system 114 includes a location criteria engine 120. In this specification, the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The location criteria engine 120 computes, for each alert identified in the alerts database 118, a cover set for each of a set of possible confidence radii. Each cover set contains one or more sub-regions, with the sub-regions containing each location that has been classified by the location criteria engine 120 as satisfying the location criteria for the alert when associated with the corresponding possible confidence radius. The location criteria engine 120 stores the data identifying the computed cover sets in a cover set database 122. That is, the cover set database 122 stores, for each of the alerts identified in the alerts database 118, data representing cover sets and the confidence radii associated with each cover set. Computing cover sets is described in more detail below with reference to FIGS. 3 and 4. When an alert request is received, the location criteria engine 120 determines whether the location criteria for the alerts in the database are satisfied using the cover sets stored in the cover set database 122. Determining whether location criteria for an alert are satisfied using cover sets is described below with reference to FIG. 2.

Figure 2:
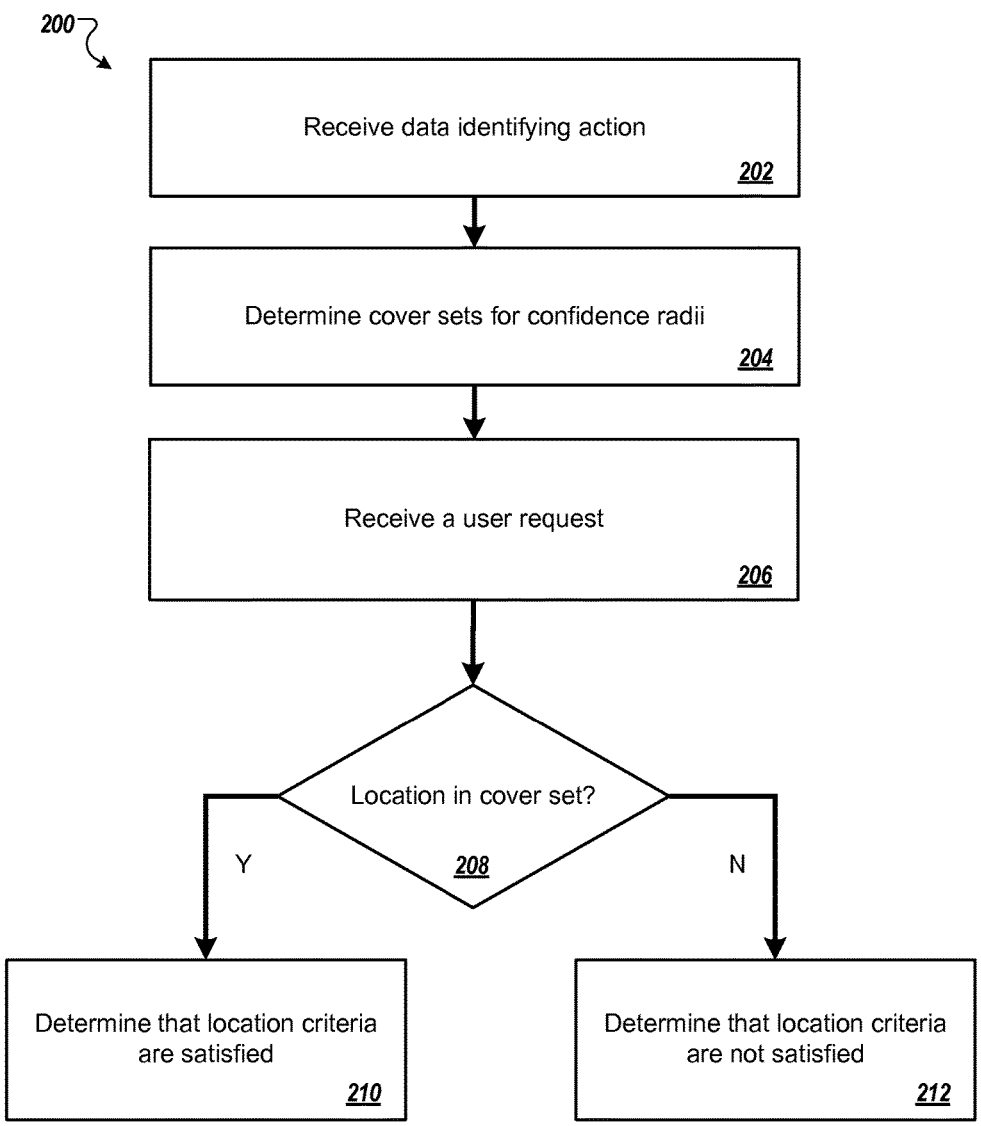
FIG. 2 is a flow diagram of an example process for determining whether location criteria for an action are satisfied.

FIG. 2 is a flow diagram of an example process 200 for determining whether location criteria for performing an action are satisfied. For convenience, the process 200 will be described as being performed by a system of one or more computers located in one or more locations. For example, a public alert system, e.g., the public alert system 114 of FIG. 1, appropriately programmed, can perform the process 200.

The system receives data identifying an action to be performed and location criteria for performing the action (step 202). For example, the action can be displaying a particular public alert. However, the action may also be any other type of action that is only relevant to users in particular geographic regions. For example, the action can be displaying other types of geographically-relevant information in response to user requests, e.g., advertisements, search results identifying local businesses, and so on. The location criteria for the action specify a target region for the action and a confidence threshold for the target region.

The system determines a respective cover set for each of a set of possible confidence radii (step 204). The cover set for a given possible confidence radius is the set of locations that satisfy the location criteria for performing the action when they are associated with the confidence radius. Determining cover sets for possible confidence radii is described in more detail below with reference to FIGS. 3 and 4.

The system receives a user request and location data associated with the user request (step 206). The location data associated with the user request includes a location and a confidence radius associated with the location.

The system determines whether the location identified in the location data is in the cover set for the confidence radius identified in the location data (step 208). That is, the system accesses data identifying the cover set for the confidence radius from a cover set database, e.g., the cover set database 122 of FIG. 1, and, from the data, determines whether the location is inside the cover set for the confidence radius.

If the location is in the cover set, the system determines that the location criteria for the action are satisfied (step 210). In some cases, once the system determines that the location criteria for the action are satisfied, the system performs the action, e.g., transmits data identifying a public alert or other geographically-relevant to the user. In some other cases, the action may be associated with other criteria, e.g., so that, even if the location criteria for the action are satisfied, the system will not perform the action if the other criteria are not also satisfied.

If the location is not in the cover set, the system determines that the location criteria for the action are not satisfied (step 212).

Figure 3:
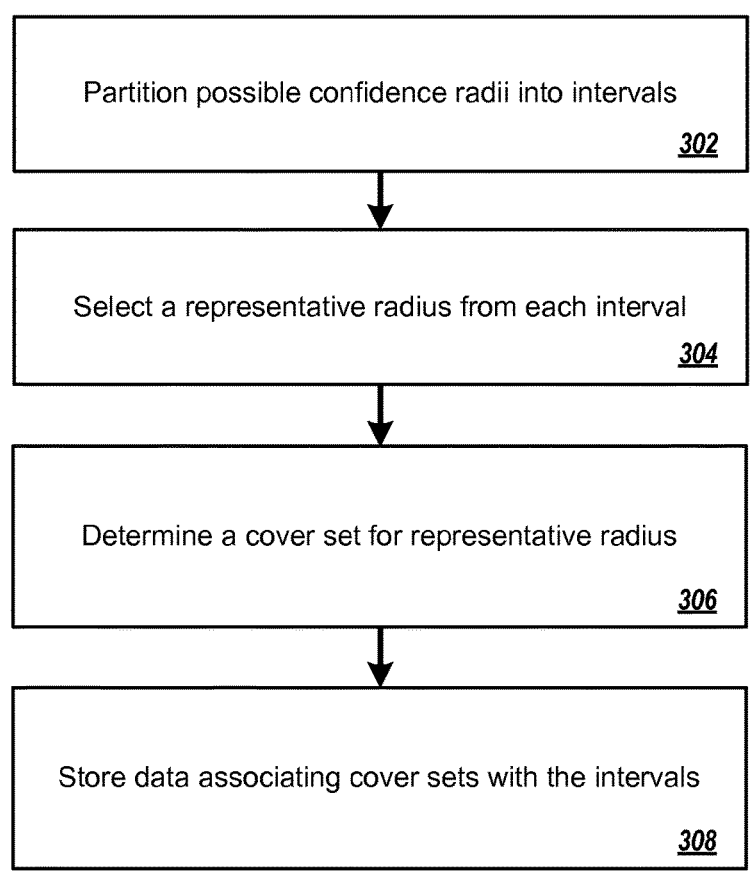
FIG. 3 is a flow diagram of an example process for determining cover sets for possible confidence radii.

FIG. 3 is a flow diagram of an example process 300 for determining cover sets for possible confidence radii. For convenience, the process 300 will be described as being performed by a system of one or more computers located in one or more locations. For example, a public alert system, e.g., the public alert system 114 of FIG. 1, appropriately programmed, can perform the process 300.

The system partitions the possible confidence radii into intervals (step 302). That is, the system determines a maximum possible confidence radius. For example, the system may select a value equal to half of the circumference of the earth as the maximum possible confidence radius. The system then partitions the range from zero to the maximum possible confidence radius into disjoint intervals. The system can partition the range into intervals in any of a variety of ways. For example, the system may partition the range into intervals of equal size. As another example, the system can partition the range so that each interval is exponentially larger than the preceding interval, e.g., the system may partition the range so that the first interval is from zero to $2^0$, the second interval is from $2^0$ to $2^1$, the third interval is from $2^1$ to $2^2$, the fourth interval is from $2^2$ to $2^3$, and so on.

The system selects a representative radius from each partition (step 304). The system can select the representative radii in any of a variety of ways. For example, the system can select the midpoint of each interval as the representative radius for the interval. As another example, in some implementations, the system selects the representative radii prior to partitioning the set of possible confidence radii into intervals. In these implementations, the system can select the representative radii as $2^0, 2^1, 2^2, 2^3, \ldots 2^N$ and can partition the range of possible confidence radii such that, for a given representative radius $2^N$, the endpoints of the interval that includes the representative radius are $(2^N + 2^{N-1})/2$ and $(2^N + 2^{N+1})/2$, i.e., the midpoint between the radius and the preceding radius in the sequence and the midpoint between the radius and the following radius in the sequence.

The system determines a cover set for each representative radius (step 306). Determining a cover set for a representative radius is described in more detail below with reference to FIGS. 4 and 5.

The system stores data associating the cover set for each representative radius with the corresponding interval (step 308). That is, the system associates the cover set for the representative radius with the interval from which the representative radius was selected. When a user request is received, in order to identify the cover set to use in determining whether the location data for the request satisfies the location criteria, the system determines which interval the confidence radius identified in the location data belongs to and uses the cover set associated with the interval in determining whether the location criteria are satisfied.

Figure 4:
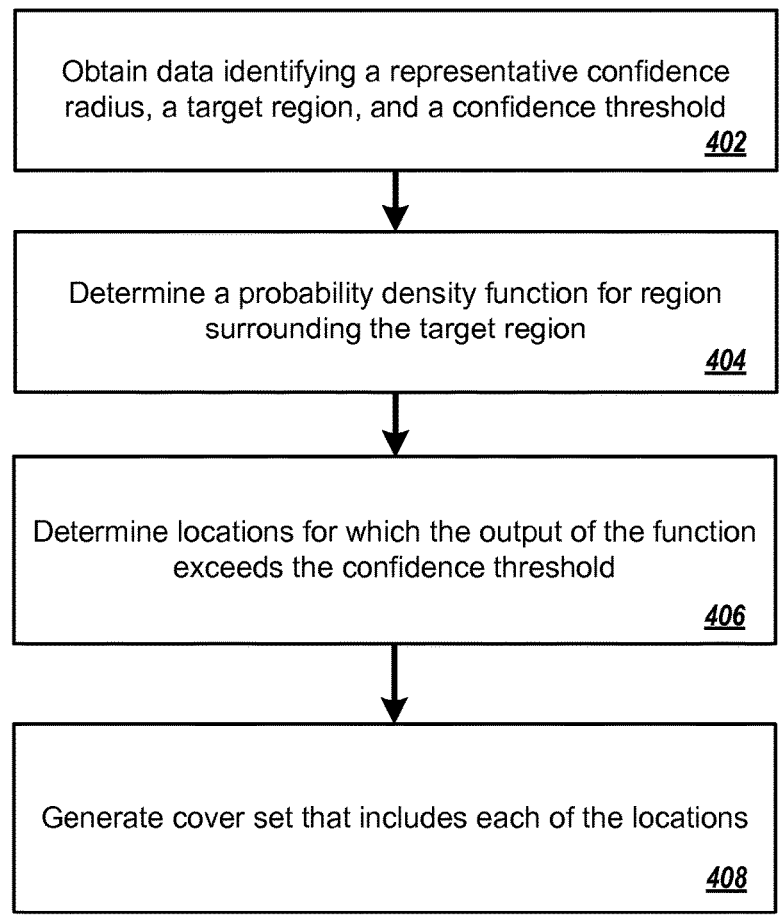
FIG. 4 is a flow diagram of an example process for determining a cover set for a representative confidence radius.

FIG. 4 is a flow diagram of an example process 400 for determining a cover set for a representative radius. For convenience, the process 400 will be described as being performed by a system of one or more computers located in one or more locations. For example, a public alert system, e.g., the public alert system 114 of FIG. 1, appropriately programmed, can perform the process 400.

The system obtains data identifying a representative confidence radius, a target region, and a confidence threshold (step 402).

The system determines a probability density function for a candidate region (step 404). The probability density function takes as an input a location in the candidate region, i.e., an (x, y) coordinate pair, and outputs a probability that the location is in the target region when associated with the representative confidence radius. Determining the probability density function is described in more detail below with reference to FIG. 5.

The system determines locations for which the output of the probability density function exceeds the confidence threshold (step 406). That is, the system determines each (x,y) for which the output of the probability density function exceeds the confidence threshold. If the confidence threshold is not expressed as a probability, the system converts the confidence threshold into a probability.

The system generates a cover set that includes each of the locations (408). That is, the cover set for a given representative radius is the set of all (x,y) coordinate pairs for which the output of the probability density function exceeds the confidence threshold.

Figure 5:
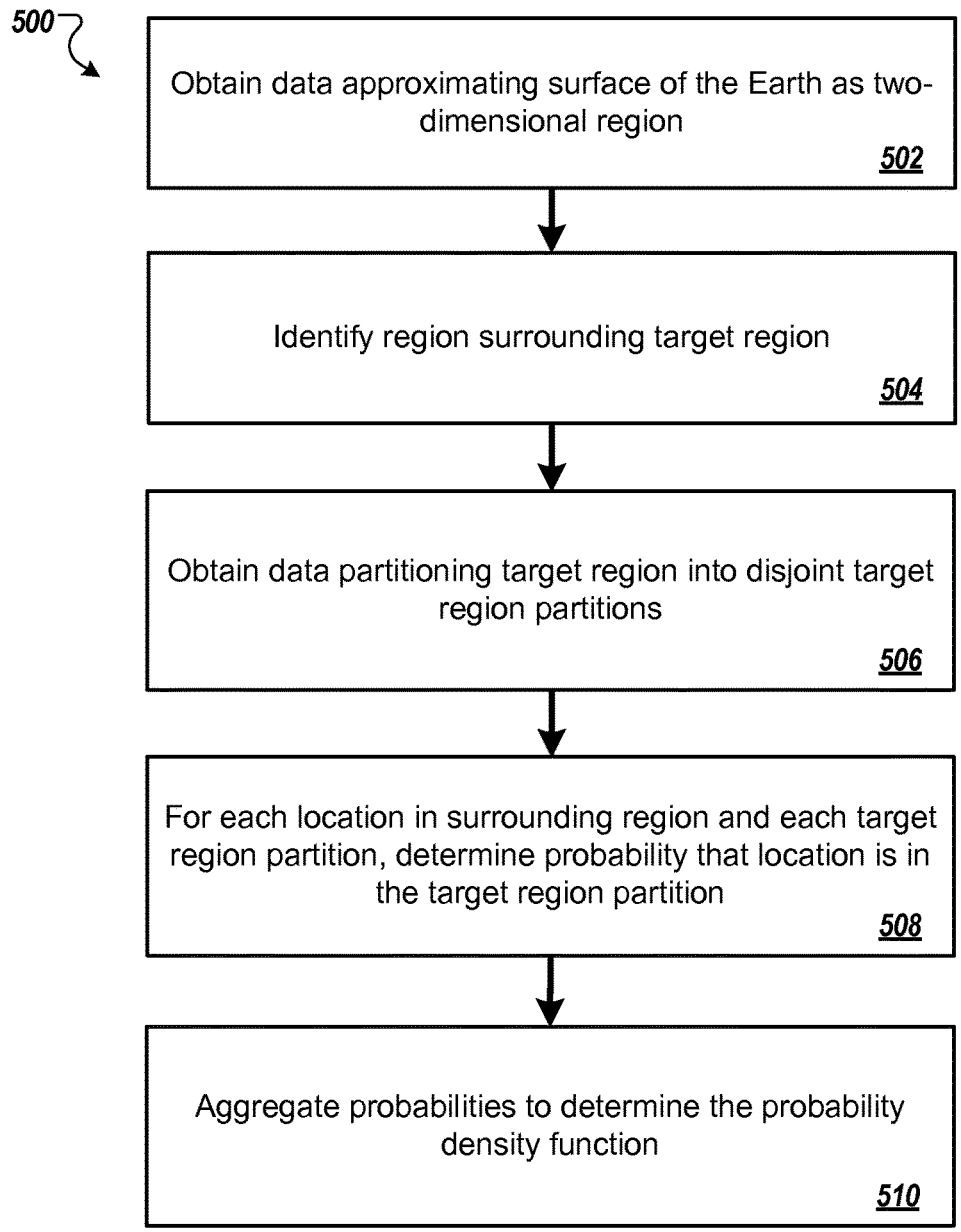
FIG. 5 is a flow diagram of an example process for determining a probability density function.

FIG. 5 is a flow diagram of an example process 500 for determining a probability density function. For convenience, the process 500 will be described as being performed by a system of one or more computers located in one or more locations. For example, a public alert system, e.g., the public alert system 114 of FIG. 1, appropriately programmed, can perform the process 500.

The system obtains data that approximates the surface of the Earth as a two-dimensional region (step 502). The system can obtain the data from a mapping service that maintains mappings between named locations, e.g., cities, states/provinces, and countries, and the respective two-dimensional region for each named location.

The system identifies the candidate region (step 504). In particular, the system identifies the candidate region as the region that contains each location for which the region of confidence intersects the target region. Thus, the candidate region includes each location in the target region and, if the radius of confidence is non-zero, other locations surrounding the target region.

The system obtains data partitioning the target region into disjoint target region partitions (step 506), e.g., by submitting a query to the mapping service that identifies the target region.

For each location in the candidate region and for each target region partition, the system determines the respective probability that the location is in the target region partition (step 508). That is, for a given location in the candidate region, the system determines a respective probability for each target region partition. The probability for the partition is the ratio of (1) the area of the intersection of the of the region of confidence centered at the location and having a radius equal to the representative radius to (2) the area of the region of confidence.

The system aggregates the probabilities for each location to determine the probability density function for the target region (step 510). That is, for each location in the candidate region, the system sums the probabilities that the location is in each target region partition to determine the value of the probability density function for the location.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. However, a computer need not have such devices. Moreover, a computer can be embedded in another device, e.g., a mobile telephone, a smart phone, a mobile audio or video player, a game console, a Global Positioning System (GPS) receiver, and a wearable computer device, to name just a few. Devices suitable for storing computer program instructions and data include all forms of non-volatile memory, media and memory devices, including by way of example semiconductor memory devices, magnetic disks, and the like. The processor and the memory can be supplemented by, or incorporated in, special purpose logic circuitry.

To provide for interaction with a user, embodiments of the subject matter described in this specification can be implemented on a computer having a display device for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input and output.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   receiving data that identifies an action and location criteria for performing the action, wherein the location criteria specifies:
   (i) a target geographic region, and
   (ii) a confidence threshold that indicates a threshold level of confidence that a location is within the target geographic region in order for the action to be performed;
   determining a respective cover set for each of a plurality of possible confidence radii,
      wherein each possible confidence radius in the plurality of possible confidence radii defines a size of a geographic region that is proportional to a level of locational uncertainty for a possible location that is associated with the possible confidence radius,
      wherein the respective cover set for each of the plurality of possible confidence radii identifies a set of locations that each have a level of confidence for being within the target geographic region that satisfies the confidence threshold when the location is associated with the possible confidence radius;
   after determining the respective cover set for each of the plurality of possible confidence radii:
      receiving a plurality of requests, each request being associated with a respective location and a confidence radius that represents a level of locational uncertainty for the respective location;
      determining, for each of the plurality of requests, whether the respective location associated with the request is in the set of locations identified by the respective cover set for the possible confidence radius that corresponds to the confidence radius that represents the level of locational uncertainty for the respective location associated with the request;
      for each request for which the respective location associated with the request is in the set of locations identified by the respective cover set for the possible confidence radius that corresponds to the confidence radius that represents the level of locational uncertainty for the respective location associated with the request, determining that the location criteria for performing the action are satisfied; and
      for each request for which the respective location associated with the request is not in the set of locations identified by the respective cover set for the possible confidence radius that corresponds to the confidence radius that represents the level of locational uncertainty for the respective location associated with the request, determining that the location criteria for performing the action are not satisfied.

2. The method of claim 1, wherein determining a respective cover set for each of the plurality of possible confidence radii comprises:
   partitioning the possible confidence radii into a plurality of intervals;
   selecting a respective representative radius from each of the plurality of intervals;
   determining a respective cover set for each representative radius; and
   for each interval, associating the cover set for the representative radius selected from the interval with the interval.

3. The method of claim 2, wherein, for each of the plurality of requests, determining whether the respective location associated with the request is in the set of locations identified by the respective cover set for the possible confidence radius that corresponds to the confidence radius that represents the level of locational uncertainty for the respective location associated with the request comprises:
  determining an interval that contains the respective location associated with the request; and
  determining whether the respective location associated with the request is in the respective cover set associated with the interval that contains the location associated with the request.

4. The method of claim 2, wherein determining a respective cover set for each representative radius comprises:
  determining, for the representative radius, a probability density function for a candidate geographic region, wherein the probability density function takes as an input an input location from the candidate geographic region and outputs a probability that the input location is in the target geographic region when associated with the representative radius;
  identifying qualifying locations, wherein an output of the probability density function exceeds the confidence threshold for each qualifying location; and
  generating a cover set for the representative radius that contains each qualifying location.

5. The method of claim 4, wherein determining the probability density function comprises:
  obtaining data partitioning the target geographic region into a plurality of disjoint target geographic region partitions;
  for each location in the candidate geographic region and for each target geographic region partition, determining a respective probability that the location in the candidate geographic region is in the target geographic region partition when the location is associated with the representative radius; and
  determining the probability density function by, for each location, aggregating the respective probabilities for each target geographic region partition.

6. The method of claim 5, wherein determining the respective probability that the location in the candidate geographic region is in the target geographic region partition when associated with the representative radius comprises:
  determining a ratio between (1) an area of an intersection between a region of confidence centered at the location and having a radius equal to the representative radius and the target geographic region partition and (2) an area of the region of confidence.

7. The method of claim 1, wherein the action to be performed comprises providing geographically-relevant information for presentation to a user.

8. A system comprising one or more computers and one or more storage devices storing instructions that when executed by the one or more computers cause the one or more computers to perform operations comprising:
  receiving data that identifies an action and location criteria for performing the action, wherein the location criteria specifies:
  (i) a target geographic region, and
  (ii) a confidence threshold that indicates a threshold level of confidence that a location is within the target geographic region in order for the action to be performed;
  determining a respective cover set for each of a plurality of possible confidence radii,
    wherein each possible confidence radius in the plurality of possible confidence radii defines a size of a geographic region that is proportional to a level of locational uncertainty for a possible location that is associated with the possible confidence radius,
    wherein the respective cover set for each of the plurality of possible confidence radii identifies a set of locations that each have a level of confidence for being within the target geographic region that satisfies the confidence threshold when the location is associated with the possible confidence radius;
  after determining the respective cover set for each of the plurality of possible confidence radii:
    receiving a plurality of requests, each request being associated with a respective location and a confidence radius that represents a level of locational uncertainty for the respective location;
    determining, for each of the plurality of requests, whether the respective location associated with the request is in the set of locations identified by the respective cover set for the possible confidence radius that corresponds to the confidence radius that represents the level of locational uncertainty for the respective location associated with the request;
    for each request for which the respective location associated with the request is in the set of locations identified by the respective cover set for the possible confidence radius that corresponds to the confidence radius that represents the level of locational uncertainty for the respective location associated with the request, determining that the location criteria for performing the action are satisfied; and
    for each request for which the respective location associated with the request is not in the set of locations identified by the respective cover set for the possible confidence radius that corresponds to the confidence radius that represents the level of locational uncertainty for the respective location associated with the request, determining that the location criteria for performing the action are not satisfied.

9. The system of claim 8, wherein determining a respective cover set for each of the plurality of possible confidence radii comprises:
  partitioning the possible confidence radii into a plurality of intervals;
  selecting a respective representative radius from each of the plurality of intervals;
  determining a respective cover set for each representative radius; and
  for each interval, associating the cover set for the representative radius selected from the interval with the interval.

10. The system of claim 9, wherein, for each of the plurality of requests, determining whether the respective location associated with the request is in the set of locations identified by the respective cover set for the possible confidence radius that corresponds to the confidence radius that represents the level of locational uncertainty for the respective location associated with the request comprises:
  determining an interval that contains the respective location associated with the request; and
  determining whether the respective location associated with the request is in the respective cover set associated with the interval that contains the location associated with the request.

11. The system of claim 9, wherein determining a respective cover set for each representative radius comprises:
  determining, for the representative radius, a probability density function for a candidate geographic region, wherein the probability density function takes as an input an input location from the candidate geographic region and outputs a probability that the input location is in the target geographic region when associated with the representative radius;

identifying qualifying locations, wherein an output of the probability density function exceeds the confidence threshold for each qualifying location; and generating a cover set for the representative radius that contains each qualifying location.

12. The system of claim 11, wherein determining the probability density function comprises:

obtaining data partitioning the target geographic region into a plurality of disjoint target geographic region partitions;

for each location in the candidate geographic region and for each target geographic region partition, determining a respective probability that the location in the candidate geographic region is in the target geographic region partition when the location is associated with the representative radius; and determining the probability density function by, for each location, aggregating the respective probabilities for each target geographic region partition.

13. The system of claim 12, wherein determining the respective probability that the location in the candidate geographic region is in the target geographic region partition when associated with the representative radius comprises:

determining a ratio between (1) an area of an intersection between a region of confidence centered at the location and having a radius equal to the representative radius and the target geographic region partition and (2) an area of the region of confidence.

14. The system of claim 8, wherein the action to be performed comprises providing geographically-relevant information for presentation to a user.

15. A non-transitory computer storage medium encoded with instructions that, when executed by one or more computers, cause the one or more computers to perform operations comprising:

receiving data that identifies an action and location criteria for performing the action, wherein the location criteria specifies:

(i) a target geographic region, and (ii) a confidence threshold that indicates a threshold level of confidence that a location is within the target geographic region in order for the action to be performed for the target region;

determining a respective cover set for each of a plurality of possible confidence radii, wherein each possible confidence radius in the plurality of possible confidence radii defines a size of a geographic region that is proportional to a level of locational uncertainty for a possible location that is associated with the possible confidence radius, wherein the respective cover set for each of the plurality of possible confidence radii identifies a set of locations that each have a level of confidence for being within the target geographic region that satisfies the confidence threshold when the location is associated with the possible confidence radius;

after determining the respective cover set for each of the plurality of possible confidence radii:

receiving a plurality of requests, each request being associated with a respective location and a confidence radius that represents a level of locational uncertainty for the respective location;

determining, for each of the plurality of requests, whether the respective location associated with the request is in the set of locations identified by the respective cover set for the possible confidence radius that corresponds to the confidence radius that represents the level of locational uncertainty for the respective location associated with the request;

for each request for which the respective location associated with the request is in the set of locations identified by the respective cover set for the possible confidence radius that corresponds to the confidence radius that represents the level of locational uncertainty for the respective location associated with the request, determining that the location criteria for performing the action are satisfied; and for each request for which the respective location associated with the request is not in the set of locations identified by the respective cover set for the possible confidence radius that corresponds to the confidence radius that represents the level of locational uncertainty for the respective location associated with the request, determining that the location criteria for performing the action are not satisfied.

16. The non-transitory computer storage medium of claim 15, wherein determining a respective cover set for each of the plurality of possible confidence radii comprises:

partitioning the possible confidence radii into a plurality of intervals;

selecting a respective representative radius from each of the plurality of intervals;

determining a respective cover set for each representative radius; and for each interval, associating the cover set for the representative radius selected from the interval with the interval.

17. The non-transitory computer storage medium of claim 16, wherein, for each of the plurality of requests, determining whether the respective location associated with the request is in the set of locations identified by the respective cover set for the possible confidence radius that corresponds to the confidence radius that represents the level of locational uncertainty for the respective location associated with the request comprises:

determining an interval that contains the respective location associated with the request; and determining whether the respective location associated with the request is in the respective cover set associated with the interval that contains the location associated with the request.

18. The non-transitory computer storage medium of claim 16, wherein determining a respective cover set for each representative radius comprises:

determining, for the representative radius, a probability density function for a candidate geographic region, wherein the probability density function takes as an input an input location from the candidate geographic region and outputs a probability that the input location is in the target geographic region when associated with the representative radius;

identifying qualifying locations, wherein an output of the probability density function exceeds the confidence threshold for each qualifying location; and generating a cover set for the representative radius that contains each qualifying location.

19. The non-transitory computer storage medium of claim 18, wherein determining the probability density function comprises:

obtaining data partitioning the target geographic region into a plurality of disjoint target geographic region partitions;

for each location in the candidate geographic region and for each target geographic region partition, determining a respective probability that the location in the candidate geographic region is in the target geographic region partition when the location is associated with the representative radius; and determining the probability density function by, for each location, aggregating the respective probabilities for each target geographic region partition.

20. The non-transitory computer storage medium of claim 19, wherein determining the respective probability that the location in the candidate geographic region is in the target geographic region partition when associated with the representative radius comprises:

determining a ratio between (1) an area of an intersection between a region of confidence centered at the location and having a radius equal to the representative radius and the target geographic region partition and (2) an area of the region of confidence.

21. The method of claim 1, further comprising, for at least one request and in response to determining that the location criteria are satisfied for the at least one request, performing the action.

* * * * *